(12) United States Patent
Schiff et al.

(10) Patent No.: US 8,121,536 B2
(45) Date of Patent: Feb. 21, 2012

(54) NOISE COMPENSATION IN SATELLITE COMMUNICATIONS

(75) Inventors: Leonard N. Schiff, San Diego, CA (US); David S. Miller, Auckland (NZ)

(73) Assignee: Qualcomm Incorporated, San Diego, CA (US)

( * ) Notice: Subject to any disclaimer, the term of this patent is extended or adjusted under 35 U.S.C. 154(b) by 874 days.

(21) Appl. No.: 10/625,167

(22) Filed: Jul. 22, 2003

(65) Prior Publication Data

US 2004/0131028 A1 Jul. 8, 2004

Related U.S. Application Data

(60) Provisional application No. 60/398,170, filed on Jul. 23, 2002.

(51) Int. Cl.
*H04B 7/185* (2006.01)
(52) U.S. Cl. ........ 455/12.1; 455/427; 370/316; 370/317
(58) Field of Classification Search ........ 455/12.1–13.4, 455/427–430; 370/316–318, 335, 337, 342, 370/345, 347–348
See application file for complete search history.

(56) References Cited

U.S. PATENT DOCUMENTS

| | | | |
|---|---|---|---|
| 5,815,506 A | 9/1998 | Gokhale | |
| 5,903,554 A | 5/1999 | Saints | |
| 6,198,730 B1 * | 3/2001 | Hogberg et al. | 370/320 |
| 6,377,561 B1 | 4/2002 | Black et al. | |
| 6,539,214 B1 * | 3/2003 | Lapaille et al. | 455/226.3 |
| 6,577,847 B2 | 6/2003 | Van Willigen | |
| 6,781,978 B1 * | 8/2004 | Xie et al. | 370/338 |
| 6,925,113 B2 * | 8/2005 | Kim et al. | 375/227 |
| 6,940,392 B2 * | 9/2005 | Chan et al. | 340/10.4 |
| 2002/0110101 A1 * | 8/2002 | Gopalakrishnan et al. | 370/335 |
| 2003/0050008 A1 * | 3/2003 | Patterson et al. | 455/12.1 |
| 2004/0127158 A1 * | 7/2004 | Dai et al. | 455/12.1 |

FOREIGN PATENT DOCUMENTS

| | | |
|---|---|---|
| EP | 0651531 | 5/1995 |
| WO | 9837713 | 8/1998 |
| WO | 9960810 | 11/1999 |
| WO | 0117311 | 3/2001 |
| WO | 0239650 | 5/2002 |
| WO | 0243341 | 5/2002 |

OTHER PUBLICATIONS

European Office Action Dated Jun. 29, 2009.

\* cited by examiner

*Primary Examiner* — Raymond Dean (57) ABSTRACT

A quality measure, such as a signal-to-noise ratio, of a signal arriving at a gateway for a return link is used to adjust a data rate for the link. The return link is transferred from a terminal to the gateway through a satellite, and shared by a number of user terminals at any given time, including the terminal for which the data rate is adjusted. The terminals sharing the link have a certain interference relationship. Adjusting a data rate for a message sent from one or more terminals through the return link in the presence of signal degradation or power loss does not appreciably change the interference relationship among the plurality of terminals.

44 Claims, 8 Drawing Sheets

NOISE COMPENSATION IN SATELLITE COMMUNICATIONS

RELATED APPLICATIONS

This application claims the benefit of prior filed provisional applications 60/398,170, filed on Jul. 23, 2002.

BACKGROUND OF THE INVENTION

I. Field of the Invention

The present invention pertains to the field of satellite communications. More particularly, this invention relates to compensating for the presence of noise in satellite communications.

II. Related Art

In a satellite communication system, one or more satellites receive a signal from a transmitter, such as a wireless user terminal, at one location and forwards the signal to a receiver, such as a ground station or gateway, at some other location. Transferring signals through satellites allows communication systems to provide communication services virtually anywhere. While not inherently inexpensive to construct and launch, satellite systems can also provide relatively cost effective services because very little land-based infrastructure, such as telephone lines, base stations, and cellular towers, is needed to cover very large areas separated out over very long distances. These advantages make satellite systems ideal for a wide variety of communications applications.

In an exemplary satellite system, user terminals communicate with a "gateway" through a satellite. A gateway provides access to other user terminals or to other gateways, and through them, other terminals or services available in a given communication system. Gateways may also be equipped to provide the terminals with access to outside networks or connected communication systems. For instance, the gateway may include an Internet access point so that terminals can access the World Wide Web, for activities such as sending and receiving email, obtaining financial or other information, and so forth, through the satellite and the gateway. Gateways may also connect user terminals to Intranets or other types of networks for business communications and information.

The terminals and gateways transmit and receive radio frequency (RF) signals that can be degraded or disrupted by the presence of noise, potentially preventing or substantially reducing the quality of communications. Signal quality is often measured as a ratio of signal level to noise level, or signal-to-noise ratio (SNR). One source of noise in radio frequency signals is interference among signals, or between signals being transferred by nearby wireless devices. Numerous techniques have been developed to control how and when signals are transmitted so that intra-user or -device interference is reduced or minimized.

One common approach or signal modulation technique used to reduce interference is called time division multiple access (TDMA). In a basic TDMA system, only one terminal is allowed to transmit a signal at any instant in time over a given frequency. Time allocated to signal transfers is divided into frames, and each frame is further divided into time slots. Each terminal that is active during a particular time frame is assigned to one of the time slots. Interference among the terminals in such a system is virtually eliminated or greatly reduced as long as frequency re-use is kept to a minimum or well controlled for adjacent areas.

Another common approach or signal modulation technique used to reduce interference is called frequency division multiple access (FDMA). In a basic FDMA system, each terminal is assigned to a frequency band, or slot. The frequency slots are often separated by guard bands, and terminals use filters so that several terminals can simultaneously transmit in separate bands. Depending on the quality of the filtering provided between frequency slots, interference among the terminals in such a system can be substantially reduced.

Yet another common approach or signal modulation technique used to reduce interference is called code division multiple access (CDMA). In a basic CDMA system, each terminal is assigned a specific code channel or code to be used in spreading or modulating signals, on the forward link, and typically a set of codes for the reverse link modulation scheme. There may be a PN code for spreading and an orthogonal code for channelizing the signals. Many terminals can transmit simultaneously using the same frequency band or overlapping bands. Signal components from a terminal transmission are spread over the frequency band based on the corresponding PN spreading and orthogonal codes. A receiver uses the same codes to reconstruct the transmission.

Depending on the number of codes and the quality of the signal generation and reconstruction, interference among the transmitting terminals in such a system can be substantially reduced.

The three signal modulation or air interface techniques or approaches, TDMA, FDMA, and CDMA, can also be used together in a variety of ways. For instance, groups of terminals can be assigned to time slots, and then within a particular time slot, terminals can be assigned to frequency slots and/or code channels or codes. Using these approaches, large numbers of terminals can be serviced by a single gateway through a satellite.

Another source of noise is called thermal noise. Thermal noise includes various naturally occurring phenomenon, not the least of which is rain. Depending on its intensity, rain can substantially degrade signal quality. One can try to increase the signal gain or power to overcome the degrading condition, but this is not always possible or even desirable. There are limits to the amount of power that can be used because wireless communication systems, especially satellite systems, are power constrained.

You can only adjust power so far before you reach a limit to the either the available power or the handling characteristics or capabilities of the equipment. In this situation, an additional mechanism is needed to overcome the problem. In addition, with power being a finite resource for wireless devices and satellites, applying more power drains that resource, which eventually requires equipment replacement, which is not practical.

Furthermore, high quality high power circuits and controls tend to be more expensive the more power they are required to accommodate, so it is desirable to be able to design systems that can maintain operation under a variety of conditions with lower power requirements.

Therefore, a need exists for noise compensation in a satellite system with little or no increase in interference.

SUMMARY

A quality of a communication signal, typically determined using a signal-to-noise ratio, at a gateway receiving signals over a return link, is used to adjust a data rate for the link. The return link is used to couple a terminal to the gateway, generally by transferring signals through a satellite. The return link is shared by a number of user terminals including the terminal for which the quality of the signal is being determined.

The user terminals sharing the link access it at relatively random times, with many being on at any instant which forms a Poisson distribution, so the terminals have a certain interference relationship. Signal degradation, which is being compensated for, reduces signal power. Adjusting a signal data rate for a message sent from one or more terminals through the return link to reflect signal degradations does not appreciably change the interference relationship among the plurality of users, since the average power over time in the communications channel remains substantially the same.

However, the energy available for accumulation in receiving a degraded signal does increase over the longer time period, to compensate for the effects of the degradation.

The data rate can be adjusted by using one of several techniques such as changing the duration of symbol times or periods for data being transferred, or changing the signal coding rate.

Apparatus and methods are used to realize embodiments for noise compensation in communications signals, such as those transferred using a satellite. A noise compensation method is realized by identifying a change in the quality or a measure of quality for a return link signal at a gateway for a return link from a terminal, such as one transferred or communicatively coupled to the gateway through a satellite, where the return link is shared by multiple terminals having an interference relationship. The data rate for a message sent from a terminal through the return link is adjusted based on the change in the return link signal quality, without changing the interference relationship among the plurality of terminals. An example return link can utilize a CDMA type modulation scheme, or a code division multiple access (CDMA) channel.

In some embodiments, the identification of a change and adjusting the data rate are performed at substantially the same time by both a transmitter of the message and a receiver of the message. The change in signal quality can be identified by observing or identifying a change in a signal-to-noise ratio for the return link from the terminal. The return link signal-to-noise ratio can include both thermal noise and interference.

In some embodiments, identifying changes is accomplished by receiving a feedback signal at the terminal for which the data rate is adjusted from the gateway that indicates at least either the return link signal-to-noise ratio or the change in the return link signal-to-noise ratio, as measured at the gateway. A change in the return link signal-to-noise ratio can be determined by measuring a forward link signal-to-noise ratio at the terminal for a forward link signal received from the gateway through the satellite, and approximating the return link signal-to-noise ratio at the gateway based on the forward link signal-to-noise ratio. In some embodiments, adjusting the data rate comprises reducing the data rate if the return link signal-to-noise ratio has fallen below a first threshold, and increasing the data rate if the return link signal-to-noise ratio has risen above a second threshold. Alternatively, adjusting the data rate comprises transmitting bits used to form the message for a longer duration of time to reduce the data rate, and transmitting message bits for a shorter duration of time to increase the data rate. In further embodiments, adjusting the data rate comprises adjusting the data rate to one of a set of discrete data-rate-to-carrier-bandwidth ratios. Further alternatives comprise adjusting the coding rate, or combinations of adjusting coding rates and bit or symbol duration to effect changes in the data rate.

In some embodiments, the return link comprises a messaging time slot positioned or located among a plurality of time slots in each of a series of time frames.

The method and apparatus can further operate to suspend the message if a current messaging time slot in a current time frame expires before the message is complete, and resume the message in a subsequent messaging time slot in a subsequent time frame.

The message may be resumed at a beginning of the subsequent messaging time slot in the subsequent time frame. The method can further comprise initiating the message at a random point within a particular messaging time slot.

In some embodiments, the method further comprises determining that the message will span more than a particular number of durations of the messaging time slot, and transmitting the message beyond an end of a messaging time slot in a particular frame until the message is complete. The determination that the message will span more than a particular number of durations of the messaging time slot can be achieved by comparing a duration of the message at the current data rate to a length threshold, having a value of a particular number of durations. Alternatively, the determination as to message span can be made by comparing a current data-rate-to-bandwidth ratio for the message to a threshold data-rate-to-bandwidth ratio.

In some embodiments, apparatus for realizing the invention comprise means for identifying a change in a return link signal quality at a gateway for a return link signal traversing between a terminal and a gateway, where the return link is shared by a plurality of terminals having an interference relationship, and means for adjusting a data rate for a message sent from the terminal through the return link based on the change in the return link signal quality without changing the interference relationship among the plurality of terminals.

The means for identifying a change in a return link signal quality can further comprise means for identifying a change in a signal-to-noise ratio for the return link.

Suitable means for identifying the change in the return link signal-to-noise ratio comprises means for receiving a feedback signal at the terminal from the gateway which signal indicates at least either the return link signal-to-noise ratio or the change in the return link signal-to-noise ratio, as measured at the gateway. Identifying a change in the return link signal-to-noise ratio can be accomplished using means for measuring a forward link signal-to-noise ratio at the terminal for forward link signals received from the gateway, and means for approximating the return link signal-to-noise ratio at the gateway based on the forward link signal-to-noise ratio.

The means for adjusting the data rate can comprise means for reducing the data rate if the return link signal-to-noise ratio has fallen below a first threshold, and means for increasing the data rate if the return link signal-to-noise ratio has risen above a second threshold. In some embodiments, the means for adjusting the data rate comprises means for transmitting bits used to form the message for a longer duration of time to reduce the data rate, and means for transmitting message bits for a shorter duration of time to increase the data rate. Alternatively the means for adjusting the data rate comprises means for adjusting the data rate to one of a set of discrete data-rate-to-carrier-bandwidth ratios. Further alternatives comprise adjusting the coding rate or combinations of adjusting coding rates and bit or symbol duration to effect desired changes in the data rate.

Where the return link comprises a messaging time slot among a plurality of time slots in each of a series of time frames, the apparatus can further comprise means for suspending the message if a current messaging time slot in a current time frame expires before the message is complete, and means for resuming the message in a subsequent messaging time slot in a subsequent time frame. The means for resuming the message may have means for resuming the message at a beginning of the subsequent messaging time slot in the subsequent time frame. In addition, the apparatus can further comprise means for initiating the message at a random point within a particular messaging time slot.

In further embodiments, the apparatus further comprises means for determining that the message will span more than a particular number of durations of the messaging time slot, and means for transmitting the message beyond an end of a messaging time slot in a particular frame until the message is complete. The means for determining that the message spans more than a particular number of durations of the messaging time slot comprises means for comparing a duration of the message at the current data rate to a length threshold, said length threshold comprising the particular number of durations.

Alternatively, the means for determining that the message spans more than a particular number of durations of the messaging time slot comprises means for comparing a current data-rate-to-bandwidth ratio for the message to a threshold data-rate-to-bandwidth ratio.

In further embodiments, the apparatus comprises a comparator to identify a change in a return link signal quality at a gateway for return link signals where the return link is shared by a plurality of terminals which have an interference relationship. A data rate generator adjusts a data rate for a message sent from the terminal through the return link based on the change in the return link signal quality (degradation), typically based on changes in a signal-to-noise ratio, without substantially impacting the interference relationship among the plurality of terminals.

When the comparator is configured to identify a change in a signal-to-noise ratio for the return link as the change in signal quality, the comparator may comprise a feedback input to receive a feedback signal from the gateway which indicates at least either the return link signal-to-noise ratio or a change in the return link signal-to-noise ratio, as measured at the gateway. When the comparator comprises a signal-to-noise detector, it measures a forward link signal-to-noise ratio at the terminal, and uses logic circuits or elements to approximate the return link signal-to-noise ratio at the gateway based on the forward link signal-to-noise ratio.

In further embodiments, a data rate generator is used to reduce the data rate if the return link signal-to-noise ratio has fallen below a first threshold, and increase the data rate if the return link signal-to-noise ratio has risen above a second threshold. This can be accomplished by having the data rate generator transmit message bits for a longer duration of time to reduce the data rate, and transmit the message bits for shorter durations of time, to increase the data rate. Alternatively, changing the data rate can be accomplished by adjusting the coding rate, or combinations of adjusting coding rates and bit or symbol durations to effect desired changes in the data rate.

In many embodiments, the return link comprises a messaging time slot among a plurality of time slots in each of a series of time frames. The data rate generator can be configured to suspend the message(s) if a current messaging time slot in a current time frame expires before the message is complete, and resume the message in a subsequent messaging time slot in a subsequent time frame. The data rate generator can be configured to determine whether or not a message will span more than a particular number of durations of the messaging time slot, and if so, transmit the message beyond an end of a messaging time slot in a particular frame until the message is complete. In additional embodiments, the data rate generator comprises a threshold comparator to compare a duration of the message at the current data rate to a length threshold, which comprises a particular number of durations. The data rate generator can also comprise a threshold comparator to compare a current data-rate-to-bandwidth ratio for the message to a threshold data-rate-to-bandwidth ratio.

To realize the features of the invention, a machine readable medium may be employed having stored thereon machine executable instructions that when executed implement a method comprising identifying a change in a return link signal quality at a gateway for a return link from a terminal communicatively coupled to the gateway, where the return link is shared by a multiplicity of terminals having an interference relationship, and adjusting a data rate for a message sent from the terminal through the return link based on the change in the return link signal quality without changing the interference relationship among the plurality of terminals. In further embodiments, when executed the instructions implement the step or process of identifying the change in signal quality by identifying a change in a signal-to-noise ratio for the return link from the terminal.

To identify a change in the return link signal-to-noise ratio, the instructions may implement a method comprising receiving a feedback signal at the terminal from the gateway that indicates at least the return link signal-to-noise ratio or and the change in the return link signal-to-noise ratio, as measured at the gateway.

The method implemented by the instructions may further comprise measuring a forward link signal-to-noise ratio at the terminal for a forward link from the gateway, and approximating the return link signal-to-noise ratio at the gateway based on the forward link signal-to-noise ratio. The instructions may implement a method of adjusting the data rate by reducing the data rate if the return link signal-to-noise ratio has fallen below a first threshold, and increasing the data rate if the return link signal-to-noise ratio has risen above a second threshold. The data rate can also be adjusted by transmitting message bits for a longer duration of time to reduce the data rate, and transmitting message bits for a shorter duration of time to increase the data rate. In other embodiments, the instructions may implement a method comprising adjusting the data rate to one of a set of discrete data-rate-to-carrier-bandwidth ratios.

In further embodiments, the return link comprises a messaging time slot among a plurality of time slots in each of a series of time frames, and executed instructions implement a method comprising suspending the message if a current messaging time slot in a current time frame expires before the message is complete, and resuming the message in a subsequent messaging time slot in a subsequent time frame. Alternatively, the instructions cause a determination to be made that the message will span more than a particular number of durations of a messaging time slot in the return link, and cause the transmission of the message beyond an end of a messaging time slot in a particular frame until the message is complete.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Embodiments of the present invention compensate for noise in a signal while creating little or no increase in interference for other signals. This is accomplished by using techniques to alter the data rate of the bits being transferred to compensate for the loss in power and cause or allow the energy per bit in the message to remain substantially unchanged or the same. The data rate can be adjusted by using one of several techniques such as changing (increasing or decreasing) the duration of symbol times or periods for the bits being transferred or transmitted, or changing (increasing or decreasing) the signal coding rate (i.e. the ratio of information bits to parity check bits, or code symbols). However, those skilled in the art will recognize that these techniques are presented for convenience in clearly describing embodiments of the invention, and that other techniques can be used within the teachings of the invention, which is not limited to these two useful approaches.

Figure 1:
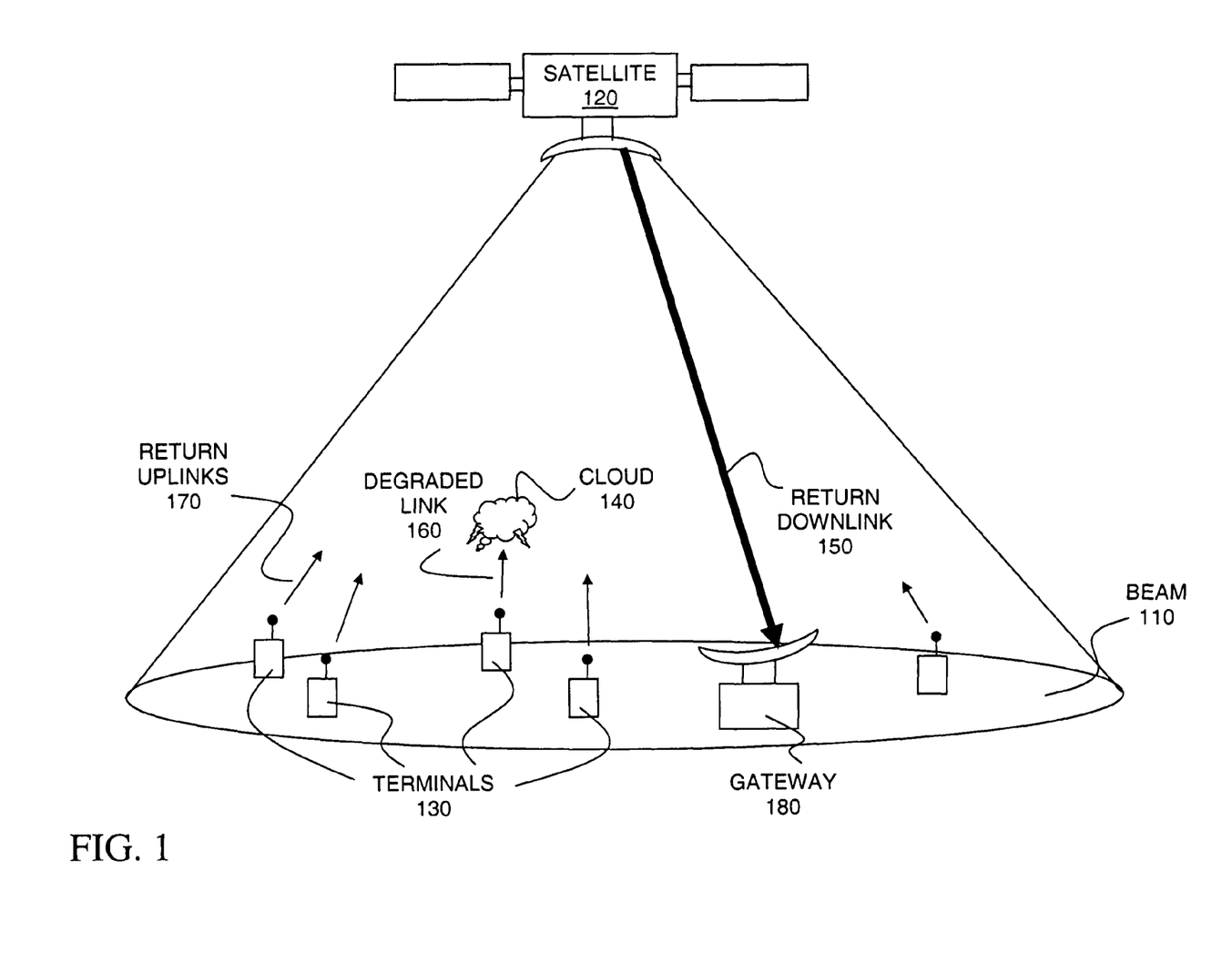
FIG. 1 illustrates one embodiment in a satellite system.

FIG. 1 illustrates a satellite system incorporating one embodiment of the present invention. A satellite 120 projects a beam 110 onto the ground. There are several ground stations within the beam 110, including a gateway 180 and a number of terminals 130. The gateway 180 could, for instance, provide access to a large area network such as the Internet, an enterprise or company Intranet, or some other external network (partially shown). The terminals 130 communicate with the external network through the satellite 120 and the gateway 180.

The group of signals that go from the terminals 130, through satellite 120, down to gateway 180 comprise the "return link." The return link includes a number of uplinks 170 from the terminals 130, and the downlink 150 from satellite 120 to gateway 180.

The return uplinks 170 are typically combined at the satellite 120 into the return downlink 150. In one embodiment, code division multiple access (CDMA) signal modulation or spreading and channelization is used in the return link to distinguish among signals from various terminals 130. That is, multiple terminals 130 can transmit, generally simultaneously, in a shared frequency band using separate codes.

In FIG. 1, cloud 140 degrades link 160. Embodiments compensate for such a degradation by detecting the change in signal quality and adjusting the rate at which data is sent through the degraded link 160. Changing the rate at which the data is sent has little or no impact on the interference in surrounding links, as stated elsewhere since the energy per bit remains unchanged. At the same time, however, changing the rate gives a receiver of the signal more time to identify each piece of data, and possibly more collected energy per bit. That is, noise tends to be random, with sporadic peaks and valleys. The valleys provide moments of clarity, so to speak, or glimpses into the data.

The longer the data is held constant, the higher the probability is that the receiver will be able to pick the data out of the noise.

In general, a certain amount of data is lost or corrupted in virtually any signal due to noise. Lost data reduces the efficiency of a system because, for instance, lost data may need to be retransmitted or reconstructed. The signal quality or signal-to-noise ratio (SNR) can be monitored for each terminal 130, as its signal is received at the gateway 180. In one embodiment, the SNR for received signals is measured at the gateway 180 and an indication of the SNR, or the change in SNR over time, is fed back to corresponding terminals 130 transmitting the signals. Alternatively, a terminal 130 could measure SNR for a forward signal received at the terminal from the gateway 180 through the satellite 120. Then, although interference tends to vary more in the return direction than in the forward direction, the SNR for the forward signal can be used to infer or approximate the SNR in the return direction.

If the SNR in the return direction is lower than desired, embodiments of the present invention compensate for the degradation by lowering the data-rate-to-bandwidth (R/BW) ratio for the link. That is, data sent by modulating a carrier signal in CDMA is a pattern of signal components spread over a certain frequency band according to a particular code. A stream of data is placed on the carrier signal by shifting or adjusting the carrier signal in particular, predefined ways for each piece of data. The adjustments to the carrier signal are detected by a receiver in order to recover the data. The R/BW ratio is the ratio of the rate at which the carrier signal is modulated to the bandwidth of the carrier. Since the bandwidth of the carrier signal is often fixed, lowering the R/BW ratio means lowering the rate at which the carrier signal is modulated. In other words, each modulation period for each piece of data lasts longer or is extended. The longer a modulation period is, the more likely it is that the receiver will be able to properly detect or track the modulation process and recover the data. The R/BW ratio can be low enough to recover data even with extremely low ratios of carrier level to noise level. Of course, as a signal changes to a less degraded state or recovers and the SNR increases, embodiments of the present invention can similarly restore, or increase, the data rate.

If there is signal degradation, as discussed above due to rain or similar effects, then the power is lowered by the impact of the degradation. This decrease in power can be counter acted by sending a message, or subsequent messages, at a lower R/BW ratio. While the message has lower power, the change in rate for the message bits means the accumulated energy for each bit, or of the message, remains relatively unchanged. That is, the energy per bit is the same, and the interference effects on other terminals are also unchanged. Furthermore, the ratio of the energy per bit to the spectral noise density (Eb/No) for the message remains unchanged.

In practice of course, SNR measurements have margins of error and R/BW ratios are unlikely to be continuously variable, having instead discrete quantized values. In which case, changes to R/BW ratios usually cannot exactly compensate for changes in actual SNR. But, within a certain margin, embodiments can substantially compensate for noise fluctuations with little or no increase in interference.

Adjusting R/BW ratios may involve a coordinated effort between a transmitter and a receiver. For instance, in one embodiment, both the terminals 130 and the gateway 180 monitor signal quality and make substantially identical adjustments to particular links independently. Alternatively, for a particular return link, just the terminal or the gateway alone may monitor the signal quality, determine when an adjustment is needed, implement the change, and instruct the other end of the link to make the same adjustment. In yet another embodiment, the transmitter makes adjustments as needed and the receiver discerns when an adjustment has been made based on the signal itself, or changes in the signal.

As another example, consider the system of FIG. 1 using CDMA signal processing in a particular TDMA time slot rather than a dedicated CDMA channel. For instance, when a terminal 130 wants to transmit a signal, an arbitration scheme could be used to assign the terminal to the next available TDMA time slot(s). Depending on the number of terminals 130 and the volume of data being transmitted, a terminal may have to wait for several time frames before a time slot becomes available. As an alternative to waiting for the next available slot, one time slot in each frame could be designated as a CDMA messaging slot. The messaging slot in each time frame could provide a sort of side channel that could be used, for instance, for short messages that may be time critical, such as control and configuration messages.

During the messaging time slot in each frame, multiple terminals could send messages simultaneously, using a common frequency band, in a CDMA mode. In the presence conditions such as clear skies and no degradation or blocking effects, the messages may be shorter than the time slot. As discussed above, various embodiments can monitor the signal quality and adjust the data rates of the various messages accordingly. Of course, lowering a data rate increases the duration of a message. At some point, a message duration may be longer than the duration of a messaging time slot. Even if a message is shorter than the duration of a time slot, messages may start at randomized times within the slot to, for instance, statistically regularize interference effects. So, a message that starts near the end of a time slot may not fit within the allotted time, especially if the link is degraded and the message has been lengthened.

One embodiment deals with this situation by suspending incomplete messages at the end of each messaging time slot. Then, when the next messaging time slot is available for that terminal, the suspended messages can be resumed. Both the transmitters and receivers can be synchronized to suspend and resume on the boundaries of the messaging time slots.

The suspend and resume approach can actually increase the efficiency of many CDMA systems. Often times, data capacity near the beginning and end of a CDMA time slot is left unused. Messages usually start at random points during a CDMA time slot to avoid certain kinds of errors. In which case, few messages are in process near the beginning of a CDMA time slot. Instead, the number of messages gradually ramps during a time slot up to a steady state. Then, near the end of the time slot, messages are often not started if not enough duration is left to finish the message within the allotted time slot. In which case, the number of simultaneous messages taper off near the end of the message. By allowing messages to be suspended at the end of one time slot and be resumed at the beginning of another, however, better utilizes the available data capacity.

If a link is severely degraded and a data rate is substantially reduced to compensate for this condition, a message can become quite long. For instance, compensating for a degradation factor on the order of 20 dB such as might be caused by a heavy rain storm, could increase a message length by more than 100 times. Not only can messages become longer than the available duration of a messaging time slot, but messages can become longer than the accumulated duration of multiple messaging time slots. Using the suspend/resume approach discussed above, a long message in a severely degraded link could take many frames worth of messaging slots to transmit.

The time duration between messaging slots during which transmission is suspended could be comparatively long in each time frame, potentially making the total duration for transmitting a long message unacceptable.

One embodiment deals with this situation by not suspending messages that are over a certain length. Instead, these long messages are allowed to continue transmitting into subsequent TDMA time slots. By avoiding the suspend time, the duration of a message can be greatly reduced. For instance, in one embodiment, if a R/BW ratio is reduced to below a certain threshold, the message is not suspended. Alternatively, the length or duration of the message could be determined and, if the message length exceeded a threshold, the message is not suspended.

Allowing a message to extend into a subsequent time slot may appear problematic at first. One would expect the message to interfere with other signals in the subsequent time slot(s), and one would expect the signal(s) in the subsequent time slot(s) to interfere with the message. After all, signals are usually separated into different time slots for the express purpose of reducing interference among the signals.

As explained below, however, interference is not effectively a problem in this example.

The terminals transmitting during a messaging time slot are likely to be spread out over a reasonably significant or large geographic area. For instance, a geosynchronous satellite can project a beam covering large portions of the Earth's surface. At any point in time, only a small percentage of terminals are likely to experience any appreciable levels of thermal noise. That is, degrading atmospheric effects like rain tend to be localized and intense rain is rare in most areas. Most of the messages are not degraded appreciably. Only a small percentage of messages are degraded at all. And, of the degraded messages, most will be adequately served using the suspend-and-resume approach described above. Only a very small percentage, usually a fraction of one percent, of terminals are likely to be experiencing rain of sufficient intensity at any instant in time to render the suspend-and-resume approach unacceptable. So, only a very small number of messages are likely to extend into a subsequent time slot, and they are low in signal strength producing low additional interference to the TDMA slots they are extended into.

With the small number of messages likely to extend into a subsequent time slot, and the comparatively small amount of interference generated by an individual message, the resulting degradation to signals in the subsequent time is likely to be insignificant, or negligible, especially for terminals under low degradation, or "clear sky" conditions.

At some point in time, one or more terminals that transmit in subsequent time slots are likely to experience links or signals that are severely degraded due, for instance, to heavy rain. For a terminal operating with severely degraded conditions in a subsequent slot, the interference effect the lengthened message from the un-degraded signal in the TDMA slot may be thought to be larger than the effect of decreased power level of the degraded terminal. However, the degraded terminal is likely to have a greatly lowered R/BW ratio and a high despreading gain to compensate for the degradation such that the interference effect from the lengthened message is unlikely to be practically noticeable. The dominant noise for the terminal is likely to be from the degradation and not the lengthened message. For instance, a degradation factor of 20 dB for rain would likely be well above the power level of the degraded terminal itself, as well as being substantially above any interference effect from the lengthened message.

So, a message lengthened into a subsequent TDMA time slot is unlikely to interfere with signals in the subsequent time slot.

Similarly, a message lengthened into a subsequent time slot will generally be unaffected by interference from signals in the subsequent time slot. First, the message will have a very low R/BW ratio, making it very accommodating for various forms of noise. Second, CDMA is designed to recover data out of interference levels that are much higher than the level of the data. The highest interference effect of a signal in a subsequent TDMA slot is likely to be considerably lower than the total interference effect that the message encounters of a communication system normally deals with during a CDMA time slot when it is received at full power. Therefore, a lengthened message is unlikely to be degraded by any interference in a subsequent time slot.

Figure 2:
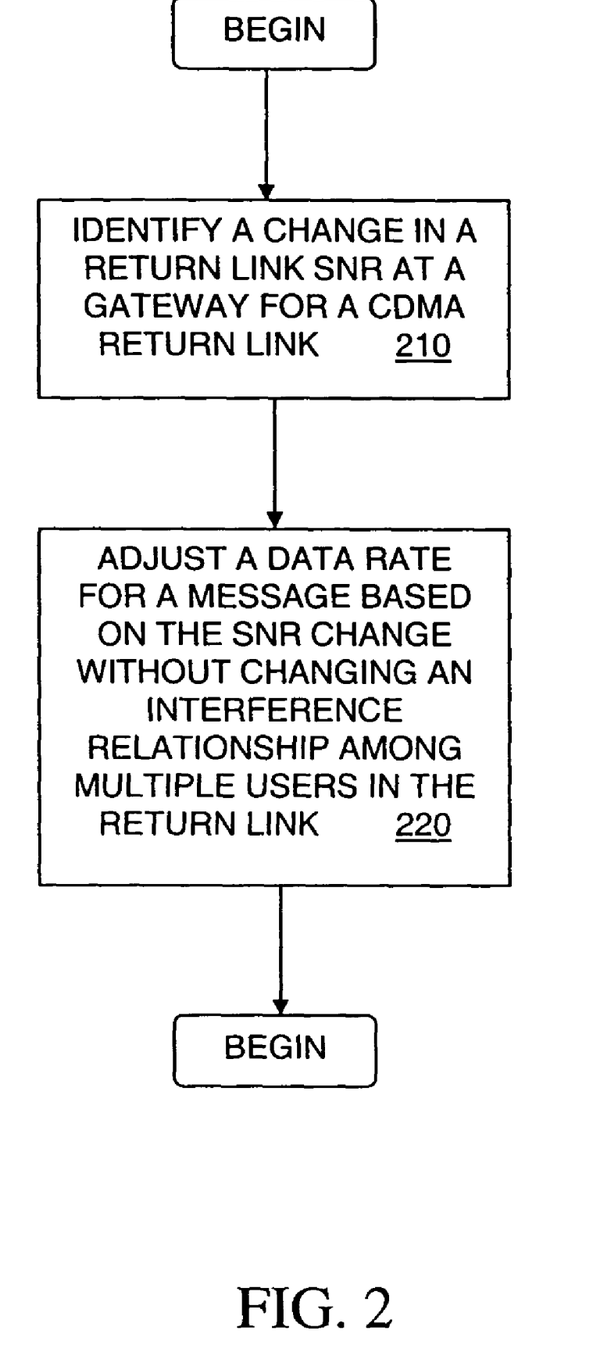
FIG. 2 illustrates one embodiment of a flow diagram for the present invention.

FIGS. 2 through 5 illustrate flowcharts for several embodiments. FIG. 2 illustrates one embodiment at a high level, including just two elements. In a step or processing stage 210, the illustrated embodiment identifies a change in the signal-to-noise ratio (SNR) for a return link. The SNR is measured at a gateway, and the return link comprises a CDMA channel.

In a step or at a processing point 220, the embodiment adjusts a data rate for a message based on the change identified in the SNR. Changing the data rate does not change, or does not significantly change, an interference relationship among multiple simultaneous users of the CDMA return link.

Figure 3:
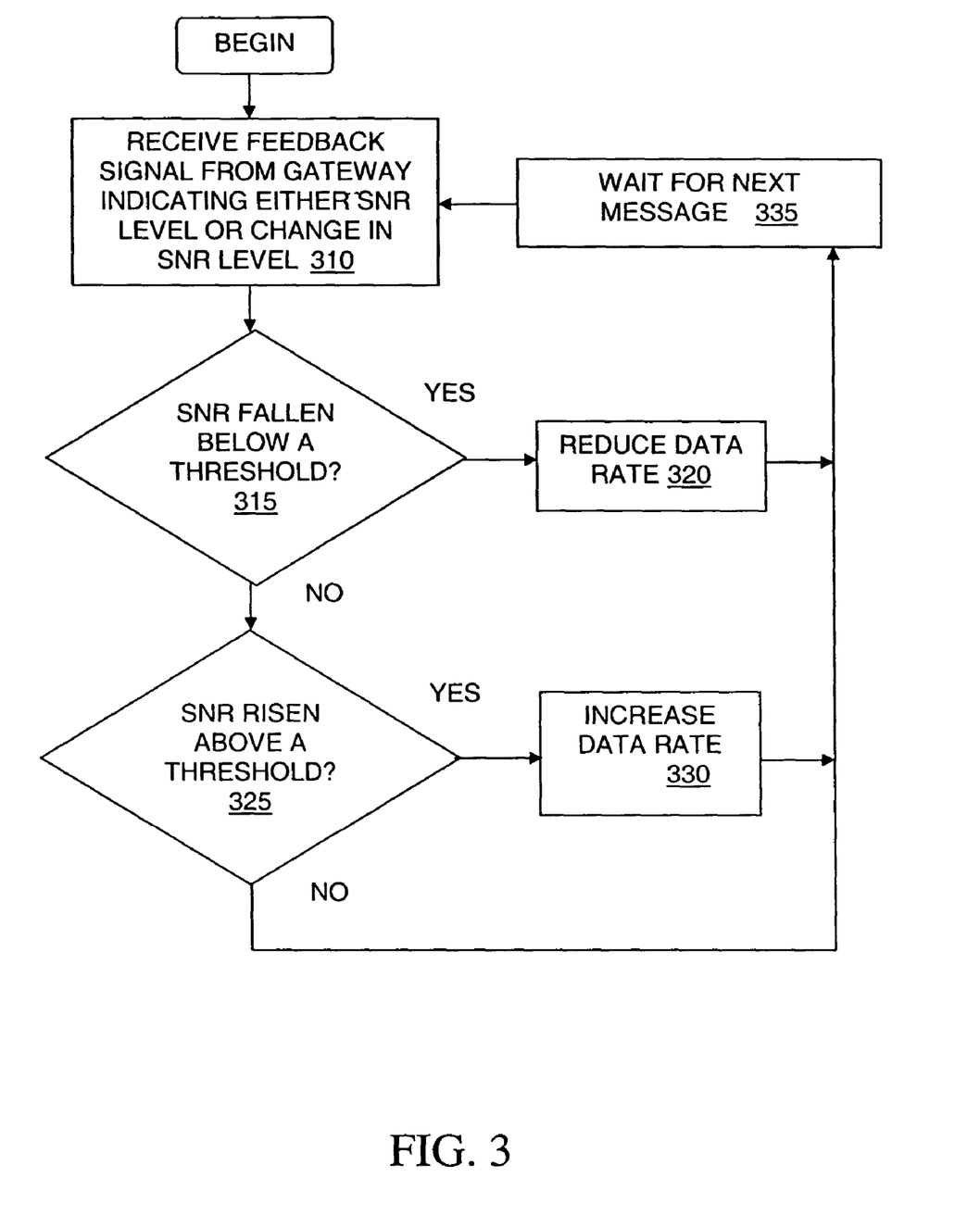
FIG. 3 illustrates another embodiment of a flow diagram in which signal quality information is received in a feedback loop.

In FIG. 3, a feedback signal is received from a gateway in a step or stage 310.

The feedback signal indicates either a value for the SNR level as measured at the gateway, or a value for the change in the SNR level as measured at the gateway. If the feedback signal indicates that the SNR has fallen below a particular threshold in step 315, the data rate for a message is reduced at step 320, and the system waits for a next message in step 335 before starting over. If, however, the SNR has risen above another threshold in step 325, the data rate is increased in step 330, and the system waits for the next message in step 335 before starting over. If the data rate is not changed in either steps 320 or 330, the system uses the previously set data rate for the current message, and then waits for the next message in step 335 before starting over.

In alternative embodiments, the data rate many be adjusted less often. For instance, rather than checking the SNR for every message, one embodiment may only check the SNR once every N messages. Certain embodiments may adjust the data rate more often. For instance, one embodiment may continually monitor or repeatedly sample the SNR and begin adjusting the data rate whenever a change in the SNR reaches a particular level, which may be during a the transmission of a particular message.

Figure 4:
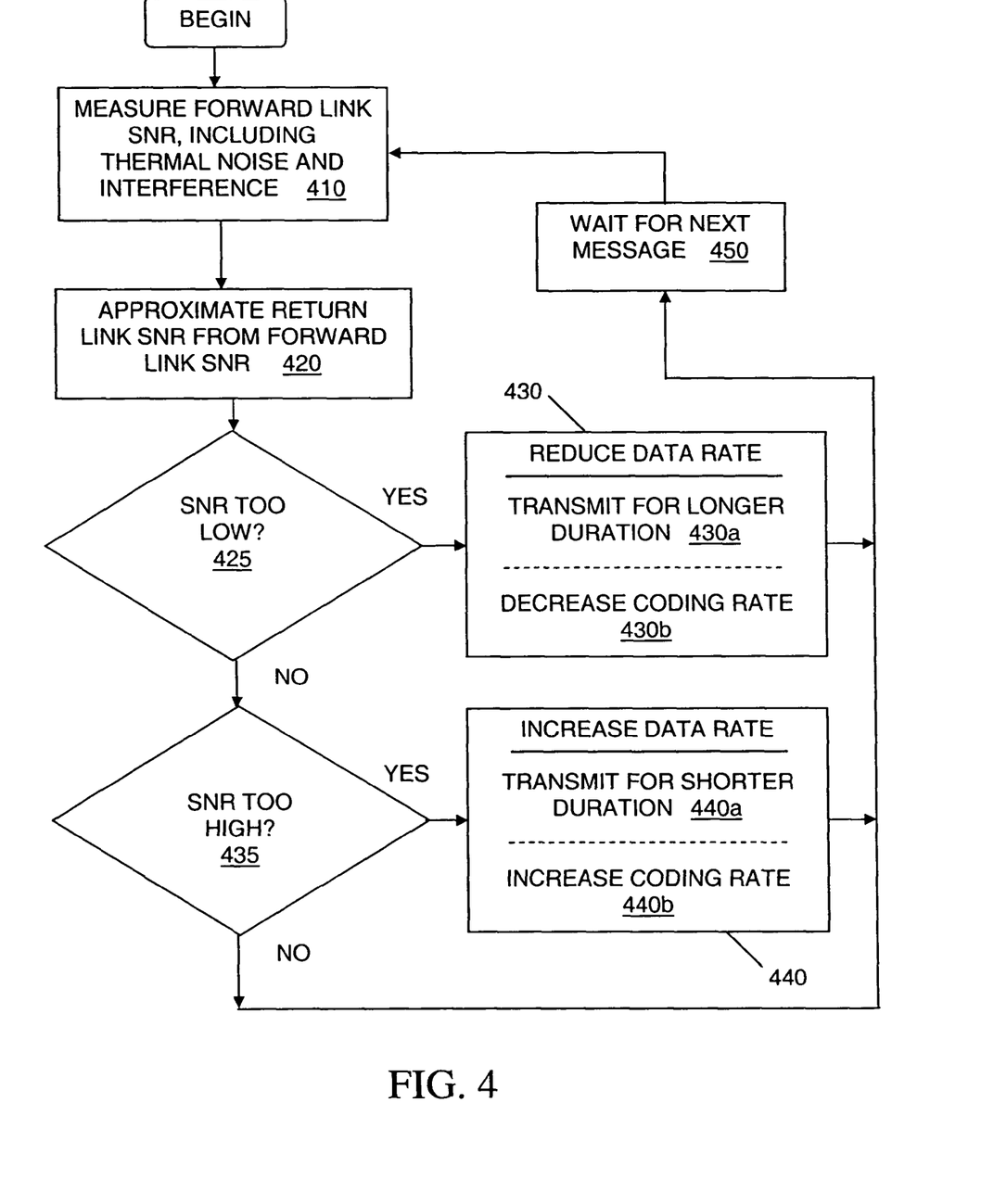
FIG. 4 illustrates another embodiment of a flow diagram in which signal quality information is inferred at a terminal.

In FIG. 4, a terminal measures an SNR for a forward link in step 410. In the illustrated embodiment, the SNR includes both thermal noise and interference. Then, in step 420, the terminal approximates an SNR for a return link based on the SNR from the forward link. Any number of approaches known to those skilled in the art can be used to infer the return link SNR from the forward link SNR.

In a step or at processing stage 425, a determination is made whether or not the resulting value for the return link SNR is too low, for example is below a threshold, as discussed above. If this is the case, this indicates that the data rate should be reduced.

The terminal transmits message bits using a lower or reduced data rate in step or stage 430. This can occur for as long as the monitored SNR stays below a certain value. The data rate change in step 430 can be accomplished in several ways, as previously discussed, such as transmitting message bits for a longer duration, 430a, or changing the coding rate for the bits, 430b to a lower rate. Other techniques for changing the data rates are known and can be applied as desired.

If, on the other hand, the return link SNR is not too low, a determination is made in a step 435 whether or not the resulting value for the return link SNR is too high, for example is above a threshold. If this is the case, it indicates that the data rate should be increased. The terminal transmits message bits using a higher or increased data rate in step or stage 440. As mentioned earlier, this can be accomplished in several ways, as previously discussed, such as transmitting message bits for a shorter duration, 440a, or changing the coding rate for the bits, 440b, to a higher rate. Other techniques for changing the data rates are known and can be applied as desired.

Alternatively, the resulting value for the return link SNR may be within appropriate levels or above and below the desired threshold values (425 and 435 are NO). In this case, no adjustment is made to the rate. Once the data rate has been adjusted, or left unchanged, the system waits for a next message in step or stage 450 before starting over.

Figure 5:
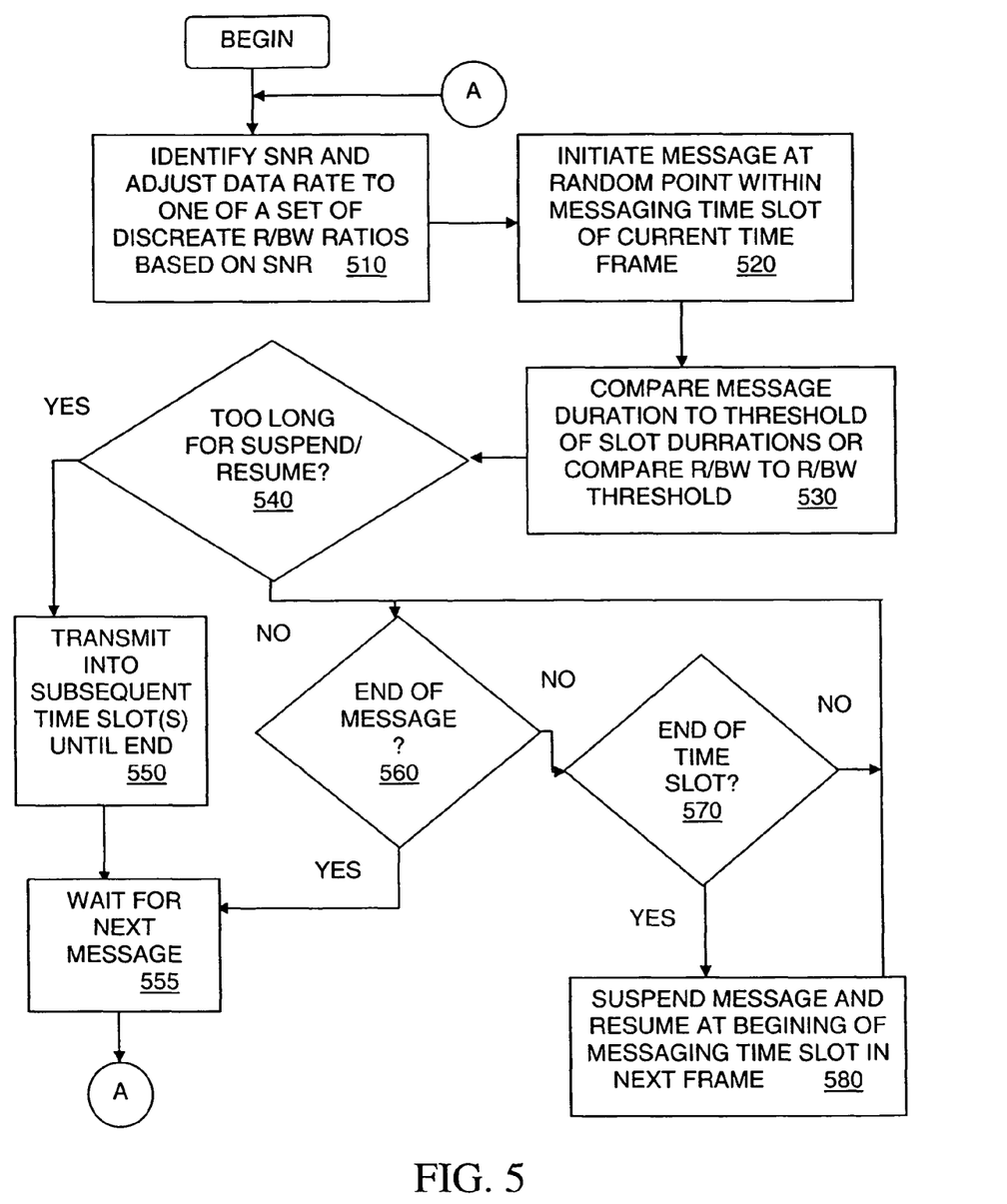
FIG. 5 illustrates another embodiment of a flow diagram in which messages are limited to TDMA time slots.

The embodiments of FIGS. 2, 3, and 4 could be used, for instance, in a CDMA mode in a dedicated frequency channel. In FIG. 5, the illustrated embodiment could be used, for instance, in TDMA time slots transferring signals or messages using a CDMA modulation mode.

The illustrated embodiment identifies the SNR for a link and adjusts the data rate to one of a set of discrete data-rate-to-bandwidth (R/BW) values in step 510. Adjusting the data rate to compensate for rain degradation, for instance, could substantially increase the length of a message. In step 520, the message is initiated at a random point within a messaging time slot of a current time frame. Meanwhile, in step or processing stage 530, the adjusted message is compared to one of two thresholds. In the illustrated embodiment, the message duration can be compared to a threshold duration that is equal to a certain number of messaging time slot durations. Or, the data-rate-to-bandwidth (R/BW) for the adjusted message can be compared to a threshold R/BW. The result of either comparison can be used in step 540 to determine if the message is too long to be acceptably divided among multiple frames using a suspend-and-resume approach. For instance, as discussed above, a message can be very long if a terminal sending the message, or the signals it is transferring, is subject to a severe rain storm, and the message could span many time frames if restricted only to messaging time slots. In one embodiment, a message that would span more than 10 frames is considered too long.

However, those skilled in the art will readily appreciate that in a given communication system or design, message lengths spanning more, or less, than 10 frames may be considered too long, or appropriate. This is an exemplary number useful in designing some embodiments.

If the message is too long, the message is allowed to be transmitted to completion in step 550, even if the message extends into one or more subsequent time slots. If the thresholds are too low for determining that a message is too long, then too many messages may extend into subsequent time slots. That is, the number of messages extending into the next time slot is too many when the cumulative interference effect of the messages has an appreciable negative impact on the signal quality of signals in the next time slot.

If, however, the message is not too long, the system checks for the end of the message in step 560. If the end of the message has not been reached, the system checks for the end of the time slot in step 570. The system loops through steps or stages 560 and 570 until either the end of the message is reached or the end of the time slot is reached. If the end of the time slot is reached before the end of the message, in step 580, the message is suspended and then resumed at the beginning of the next messaging time slot in the next time frame. As discussed above, this suspend-and-resume approach can increase efficiency in messaging time slots. When the end of the message is reached, either in steps 550 or 560, the system waits for the next message in step 555 before returning to start over in step or processing stage 510.

Figure 6:
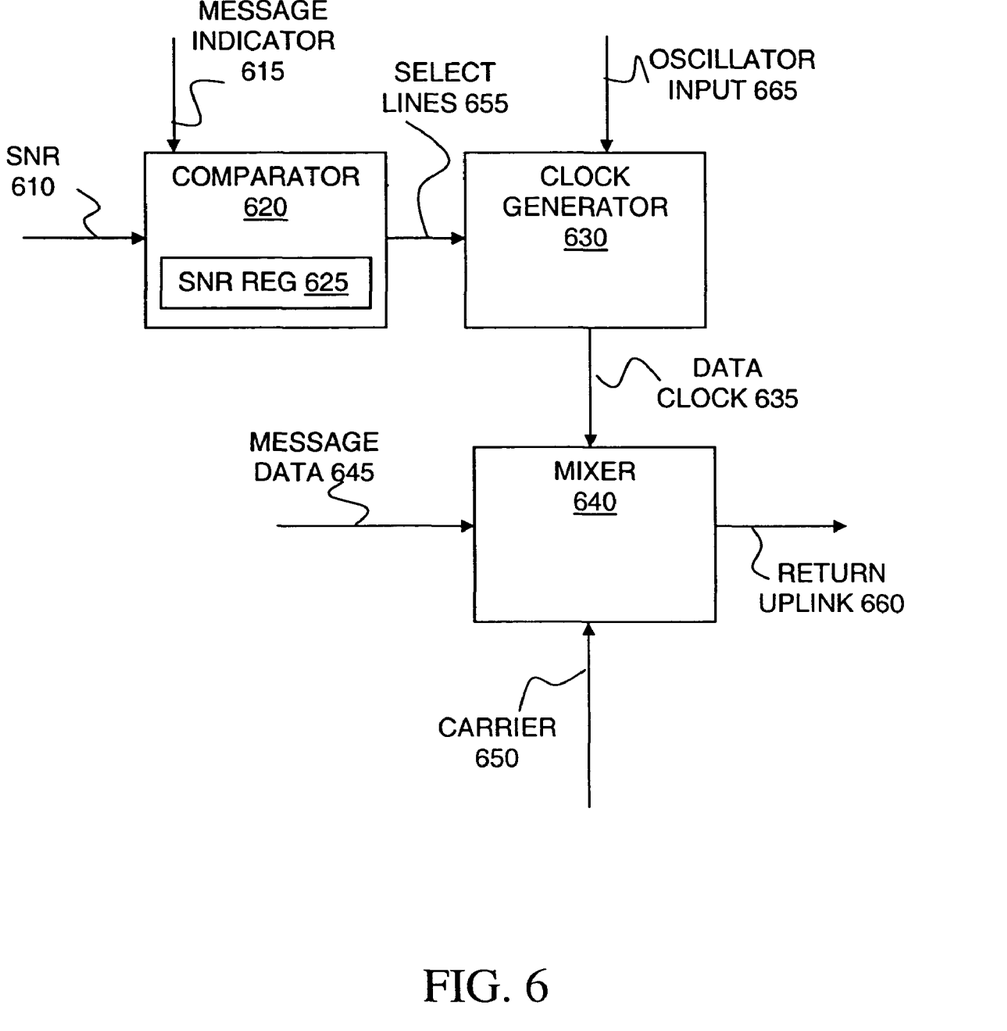
FIG. 6 illustrates one embodiment of a hardware system for the present invention.

FIG. 6 illustrates a block diagram for one embodiment of the present invention.

The illustrated block diagram could be used in a terminal to monitor signal quality and adjust a data rate for a signal accordingly. A similar system could be used at a receiver of a message by using a mixer in the reverse direction to recover the message data from the return link. In alternative embodiments, the components could be separated between a terminal and a gateway. For instance, a gateway may include comparator 620 and a terminal may include clock generator 630 and mixer 640.

In the illustrated embodiment, a comparator 620 receives a message indicator 615. The message indicator 615 alerts the comparator that a new message is waiting to be transmitted. In response to the message indicator 615, comparator 620 reads the SNR value 610. Alternative embodiments may not use a message indicator 615, but may instead continually, or repeatedly, such as at predetermined time intervals, monitor the SNR 610. As discussed above, the SNR 615 can be received in a feedback loop from a gateway, or the SNR 615 may be inferred at the terminal based on an SNR in a forward link.

Comparator 620 compares the SNR 615 to an SNR value stored in SNR register 625. The value stored in the register could be a previously determined SNR value. In which case, comparator 615 compares the two values to identify an amount of change in the SNR value. Alternatively, the value stored in the register 625 could comprise one or more a pre-selected threshold SNR values to which the SNR 610 is compared.

The results generated by comparator 620 are transferred to or received by clock generator 630 over select lines 655. Clock generator 630 receives oscillator input 665 and can derive a number of different data rates from the oscillator. The select lines 655 indicate which data rate clock generator 630 should generate or utilize is creating a data clock output. Clock generate 630 provides the data clock 635 at the desired data rate.

Mixer 640 receives the data clock 635 along with message data 645 and carrier 650.

Mixer 640 modulates the message data 645 onto the carrier 650 at the rate defined by the data clock 635 and outputs the return uplink 660. The message data can be suspended and resumed by stopping and starting data clock 635.

Figure 7:
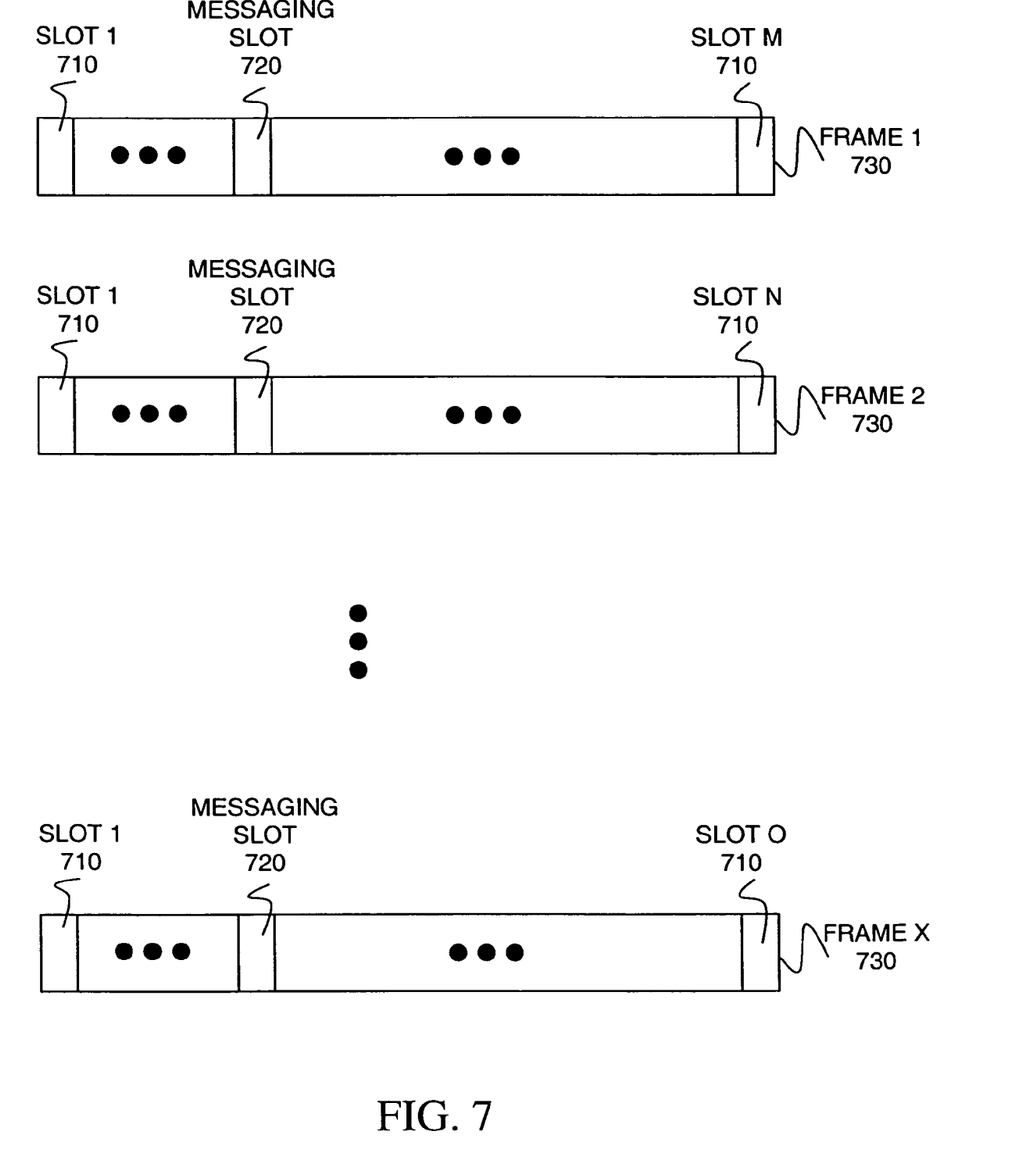
FIG. 7 illustrates one embodiment of TDMA time frames and time slots.

FIG. 7 illustrates one embodiment of a series of TDMA time frames 730. There are a large number X of time frames 730. Each frame 730 includes some number of slots 710. In the illustrated embodiment, the number of slots 710 per frame 730 can change from frame to frame. Each time frame 730 also includes a messaging slot 720.

As discussed above, the messaging slots 720 can collectively provide a type of side channel to service short messages from multiple simultaneous users with little delay.

Each time frame 730 is connected in time. That is, an end of one time frame is followed by the next time frame. A message started in a time slot 720 in one frame 730 can be suspended and then resumed in one or more time slots 720 in subsequent time frames. A message that is so long that it would span many time frames may be allowed to expand into subsequent time slots 710 within a given time frame 730.

Figure 8:
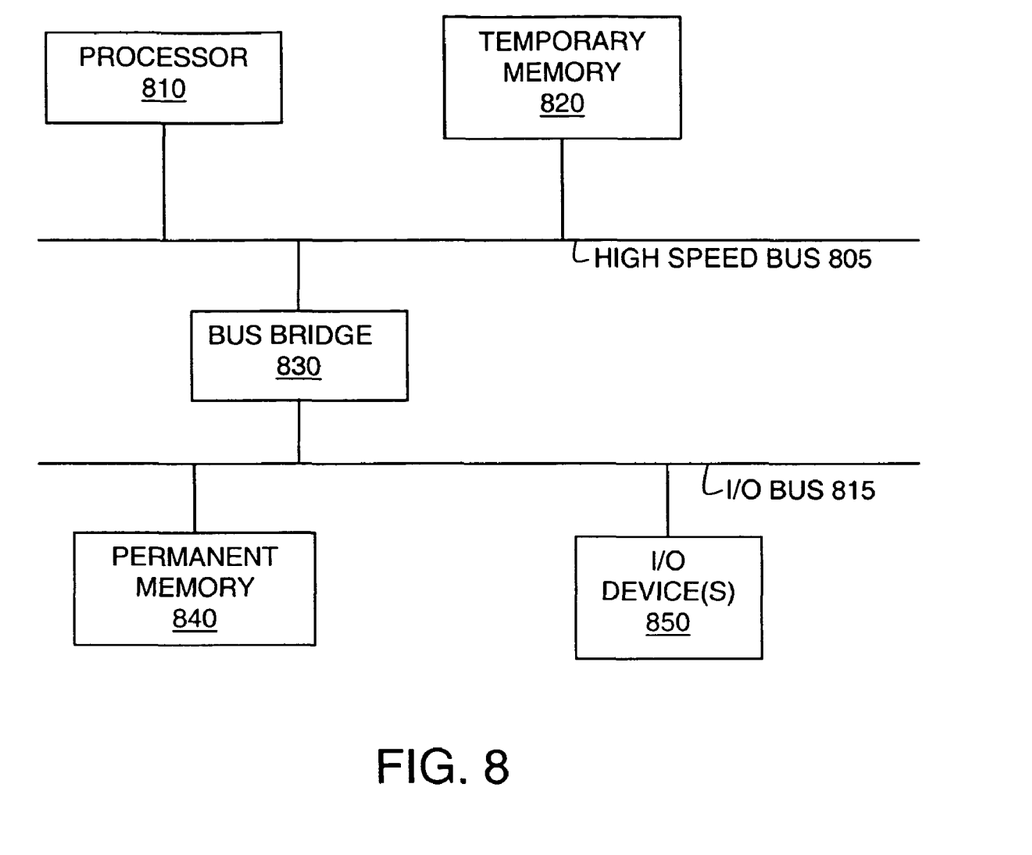
FIG. 8 illustrates one embodiment of a hardware system to implement various embodiments.

Various embodiments of the present invention us computational resources to carry out the above-described functionality. FIG. 8 illustrates one embodiment of a hardware system intended to represent a broad category of computer systems such as personal computers, workstations, and/or embedded systems. In the illustrated embodiment, the hardware system includes processor 810 coupled to high speed bus 805, which is coupled to input/output (I/O) bus 815 through bus bridge 830. Temporary memory 820 is coupled to bus 805. Permanent memory 840 is coupled to bus 815. I/O device(s) 850 is also coupled to bus 815. I/O device(s) 850 may include a display device, a keyboard, one or more external network interfaces, etc.

Certain embodiments may include additional components, may not require all of the above components, or may combine one or more components. For instance, temporary memory 820 may be on-chip with processor 810. Alternatively, permanent memory 840 may be eliminated and temporary memory 820 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternative internal networks including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, is implemented using one or more hardware systems such as the hardware system of FIG. 8. Where more than one computer is used, the systems can be coupled to communicate over an external network, such as a local area network (LAN), an internet protocol (IP) network, etc. In one embodiment, the present invention is implemented as software routines executed by one or more execution units within the computer (s). For a given computer, the software routines can be stored on a storage device, such as permanent memory 840.

Figure 9:
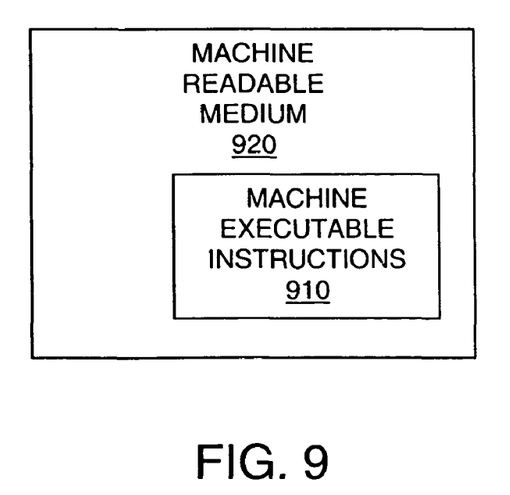
FIG. 9 illustrates one embodiment of a machine-readable medium to store executable instructions to implement various embodiments.

Alternatively, as shown in FIG. 9, the software routines can be machine executable instructions 910 stored using any suitable machine readable storage medium 920, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 850 of FIG. 8.

From whatever source, the instructions may be copied from the storage device into temporary memory 820 and then accessed and executed by processor 810. In one implementation, these software routines are written in the C programming language. It is to be appreciated, however, that these routines may be implemented in any of a wide variety of programming languages.

In alternative embodiments, the present invention is implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, noise compensation in a satellite communications is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What we claim as our invention is:

1. A method comprising:
   employing a processor executing computer-readable instructions to perform the following acts:
   identifying, by a terminal, a change in a return link signal quality of a gateway for a return link from the terminal through a satellite to the gateway, the return link being shared by a plurality of terminals having an interference relationship, wherein the identifying the change in the return link signal quality comprises:
   identifying a change in a signal-to-noise ratio for the return link from the terminal comprising:
   measuring a forward link signal-to-noise ratio at the terminal for a forward link from the gateway through the satellite to the terminal; and
   approximating the signal-to-noise ratio for the return link at the gateway based on the forward link signal-to-noise ratio;
   interpreting the change in the signal-to-noise ratio as indicating the change in the return link signal quality;
   receiving a feedback signal at the terminal, from the gateway, the feedback signal indicating at least one of the signal-to-noise ratio for the return link as measured at the gateway or the change in the signal-to-noise ratio for the return link as measured at the gateway; and
   adjusting a data rate, at the terminal, for a message sent from the terminal via the return link based on the change in the return link signal quality, without changing the interference relationship among the plurality of terminals, wherein the adjusting the data rate increases the return link signal quality in response to a degradation of the return link signal quality.

2. The method of claim 1, wherein the signal-to-noise ratio for the return link includes thermal noise and interference.

3. The method of claim 1, wherein the identifying the change in the signal-to-noise ratio for the return link comprises:
   measuring a forward link signal-to-noise ratio at the terminal for a forward link from the gateway through the satellite to the terminal; and
   approximating the signal-to-noise ratio for the return link at the gateway based on the forward link signal-to-noise ratio.

4. The method of claim 1, wherein the adjusting the data rate comprises:
   reducing the data rate if the signal-to-noise ratio for the return link is less than a first threshold; and
   increasing the data rate if the signal-to-noise ratio for the return link is greater than a second threshold.

5. The method of claim 1, wherein the adjusting the data rate comprises:
   transmitting a bit of the message for a first duration of time to reduce the data rate; and
   transmitting a bit of the message for a second duration of time to increase the data rate, the first duration of time being greater than the second duration of time.

6. The method of claim 1, wherein the adjusting the data rate comprises adjusting the data rate to one of a set of discrete data rate-to-carrier bandwidth ratios.

7. The method of claim 1, wherein the adjusting the data rate comprises:
   applying a first coding rate to bits of the message to increase the data rate; and
   applying a second coding rate to bits of the message to reduce the data rate, the first coding rate being greater than the second coding rate.

8. The method of claim 7, wherein the adjusting the data rate further comprises:
   transmitting a bit of the message for a first duration of time to further reduce the data rate; and
   transmitting a bit of the message for a second duration of time to further increase the data rate, the first duration of time being greater than the second duration of time.

9. The method of claim 1, wherein the return link comprises a code division multiple access (CDMA) channel.

10. The method of claim 1, wherein the return link comprises a current messaging time slot among a plurality of time slots in a series of time frames, the method further comprising:
    suspending the message if the current messaging time slot in a current time frame expires before the message is complete; and
    resuming the message in a messaging time slot subsequent to the current messaging time slot in a time frame subsequent to the current time frame.

11. The method of claim 10, wherein the resuming the message comprises resuming the message at a beginning of the messaging time slot subsequent to the current messaging time slot in the time frame subsequent to the current time frame.

12. The method of claim 1, wherein the return link comprises a messaging time slot among a plurality of time slots in a series of time frames, the method further comprising initiating the message at a random time within the messaging time slot.

13. The method of claim 1, wherein the return link comprises a messaging time slot among a plurality of time slots in a series of time frames, the method further comprising:
determining that a duration of the message is greater than a selected number of durations of the messaging time slot; and
transmitting the message for a transmission duration greater than a duration of the messaging time slot, wherein the message is transmitted until a transmission of the message is complete.

14. The method of claim 13, wherein the determining that the duration of the message is greater than the selected number of durations of the messaging time slot comprises:
comparing the duration of the message at a current data rate to a length threshold, the length threshold being indicative of the selected number of durations of the messaging time slot.

15. The method of claim 13, wherein the determining that the duration of the message is greater than the selected number of durations of the messaging time slot comprises:
comparing a data rate-to-bandwidth ratio for the message to a threshold data rate-to-bandwidth ratio.

16. An apparatus comprising:
means for identifying, by a terminal, a change in a return link signal quality for a gateway for a return link from the terminal through a satellite to the gateway, the return link being shared by a plurality of terminals having an interference relationship, wherein the means for identifying the change in the return link signal quality comprises:
means for identifying a change in a signal-to-noise ratio for the return link from the terminal, the means for identifying a change in a signal-to-noise ratio comprising:
means for measuring a forward link signal-to-noise ratio at the terminal for a forward link from the gateway through a satellite to the terminal; and
means for approximating the signal-to-noise ratio for the return link at the gateway based on the forward link signal-to-noise ratio; and
means for interpreting the change in the signal-to-noise ratio for the return link as indicating the change in the return link signal quality;
means for receiving a feedback signal at the terminal, from the gateway, the feedback signal indicating at least one of the signal-to-noise ratio for the return link as measured at the gateway or the change in the return link signal-to-noise ratio as measured at the gateway; and
means for adjusting a data rate, at the terminal, for a message sent from the terminal via the return link based on the change in the return link signal quality without changing the interference relationship among the plurality of terminals, wherein the means for adjusting the data rate increases the return link signal quality in response to a degradation of the return link signal quality.

17. The apparatus of claim 16, wherein the means for adjusting the data rate comprises:
means for reducing the data rate if the signal-to-noise ratio for the return link is less than a first threshold; and
means for increasing the data rate if the signal-to-noise ratio for the return link is greater than a second threshold.

18. The apparatus of claim 16, wherein the means for adjusting the data rate comprises:

means for transmitting a bit of the message for a first duration of time to reduce the data rate; and
means for transmitting a bit of the message for a second duration of time to increase the data rate, the first duration of time being greater than the second duration of time.

19. The apparatus of claim 16, wherein the means for adjusting the data rate comprises:
means for applying a first coding rate to bits of the message to increase the data rate; and
means for applying a second coding rate to bits of the message to reduce the data rate, the first coding rate being greater than the second coding rate.

20. The apparatus of claim 19, wherein the means for adjusting the data rate further comprises:
means for transmitting a bit of the message for a first duration of time to further reduce the data rate; and
means for transmitting a bit of the message for a second duration of time to further increase the data rate, the first duration of time being greater than the second duration of time.

21. The apparatus of claim 16, wherein the means for adjusting the data rate comprises means for adjusting the data rate to one of a set of discrete data rate-to-carrier bandwidth ratios.

22. The apparatus of claim 16, wherein the return link comprises a current messaging time slot among a plurality of time slots in a series of time frames, the apparatus further comprising:
means for suspending the message if the current messaging time slot in a current time frame expires before the message is complete; and
means for resuming the message in a messaging time slot subsequent to the current messaging time slot in a time frame subsequent to the current time frame.

23. The apparatus of claim 22, wherein the means for resuming the message comprises means for resuming the message at a beginning of the messaging time slot subsequent to the current messaging time slot in the time frame subsequent to the current time frame.

24. The apparatus of claim 16, wherein the return link comprises a messaging time slot among a plurality of time slots in a series of time frames, the apparatus further comprising means for initiating the message at a random time within the messaging time slot.

25. The apparatus of claim 16, wherein the return link comprises a messaging time slot among a plurality of time slots in a series of time frames, the apparatus further comprising:
means for determining that a duration of the message is greater than a selected number of durations of the messaging time slot; and
means for transmitting the message for a transmission duration greater than a duration of the messaging time slot, wherein the message is transmitted until its transmission is complete.

26. The apparatus of claim 25, wherein the means for determining that the duration of the message is greater than a selected number of durations of the messaging time slot comprises:
means for comparing the duration of the message at a current data rate to a length threshold, the length threshold being indicative of the selected number of durations of the messaging time slot.

27. The apparatus of claim 25, wherein the means for determining that the duration of the message is greater than a selected number of durations of the messaging time slot comprises:

means for comparing a current data rate-to-bandwidth ratio for the message to a threshold data rate-to-bandwidth ratio.

28. An apparatus comprising:

a comparator configured to identify a change, by a terminal, in a return link signal quality for a gateway for a return link from the terminal through a satellite to the gateway, the return link being shared by a plurality of terminals having an interference relationship, wherein identifying the change in the return link signal comprises:

identifying a change in a signal-to-noise ratio for the return link from the terminal comprising:

measuring a forward link signal-to-noise ratio at the terminal for a forward link from the gateway through the satellite to the terminal; and approximating the signal-to-noise ratio for the return link at the gateway based on the forward link signal-to-noise ratio; and interpreting the change in the signal-to-noise ratio as indicating the change in the return link signal quality; and a data rate generator configured to adjust a data rate, at the terminal, for a message sent from the terminal via the return link based on the change in the return link signal quality without changing the interference relationship among the plurality of terminals, wherein the data rate generator is configured to receive a feedback signal, at a terminal feedback input, from the gateway, the feedback signal indicating at least one of the signal-to-noise ratio for the return link as measured at the gateway or the change in the signal-to-noise ratio for the return link as measured at the gateway, and the data rate generator adjusts the data rate to increase the return link signal quality in response to a degradation of the return link signal quality.

29. The apparatus of claim 28, wherein the comparator comprises:

a signal-to-noise detector configured to measure a forward link signal-to-noise ratio at the terminal for a forward link from the gateway through the satellite to the terminal; and a logic block configured to approximate the signal-to-noise ratio for the return link at the gateway based on the forward link signal-to-noise ratio.

30. The apparatus of claim 28, wherein the data rate generator is configured to reduce the data rate if the signal-to-noise ratio for the return link is less than a first threshold, and increase the data rate if the signal-to-noise ratio for the return link is greater than a second threshold.

31. The apparatus of claim 28, wherein the data rate generator is configured to transmit a bit of the message for a first duration of time to reduce the data rate, and transmit a bit of the message for a second duration of time to increase the data rate, the first duration of time being greater than the second duration of time.

32. The apparatus of claim 28, wherein the data rate generator is configured to encode a bit of the message at a first code rate to reduce the data rate, and encode a bit of the message at a second code rate to increase the data rate, the first code rate being greater than the second code rate.

33. The apparatus of claim 28, wherein the return link comprises a current messaging time slot among a plurality of time slots in a series of time frames, and wherein the data rate generator is configured to suspend the message if the current messaging time slot in a current time frame expires before completion of the message, and resume the message in a messaging time slot subsequent to the current messaging time slot in a time frame subsequent to the current time frame.

34. The apparatus of claim 28, wherein the return link comprises a messaging time slot among a plurality of time slots in a series of time frames, and wherein the data rate generator is configured to determine that a duration of the message is greater than a selected number of durations of the messaging time slot, and transmit the message for a transmission duration greater than a duration of the messaging time slot, wherein the message is transmitted until a transmission of the message is complete.

35. The apparatus of claim 28, wherein the data rate generator comprises:

a threshold comparator configured to compare a duration of the message at a current data rate to a length threshold, the length threshold being indicative of the selected number of durations of the messaging time slot.

36. The apparatus of claim 28, wherein the data rate generator comprises:

a threshold comparator configured to compare a current data rate-to-bandwidth ratio for the message to a threshold data rate-to-bandwidth ratio.

37. A machine-readable storage medium having stored thereon machine-executable instructions adapted for causing a machine to perform a method comprising:

identifying a change, at a terminal, in a return link signal quality for a gateway for a return link from the terminal through a satellite to the gateway, the return link being shared by a plurality of terminals having an interference relationship, wherein identifying the change in the return link signal quality comprises:

identifying a change in a signal-to-noise ratio for the return link from the terminal; and interpreting the change in the signal-to-noise ratio as indicating the change in the return link signal quality;

receiving a feedback signal at the terminal, from the gateway, the feedback signal indicating at least one of the signal-to-noise ratio for the return link as measured at the gateway or the change in the signal-to-noise ratio for the return link as measured at the gateway; and adjusting a data rate, at the terminal, for a message sent from the terminal via the return link based on the change in the return link signal quality without changing the interference relationship among the plurality of terminals, wherein the return link comprises a messaging time slot among a plurality of time slots in a series of time frames, and the message is initiated at a random time within the messaging time slot, and the adjusting the data rate increases the return link signal quality in response to a degradation of the return link signal quality.

38. The machine-readable storage medium of claim 37, wherein the machine-executable instructions are further adapted for causing the machine to perform a method comprising:

measuring a forward link signal-to-noise ratio at the terminal for a forward link from the gateway through the satellite to the terminal; and approximating the signal-to-noise ratio for the return link at the gateway based on the forward link signal-to-noise ratio.

39. The machine-readable storage medium of claim 37, wherein the machine-executable instructions are further adapted for causing the machine to perform a method comprising:
  reducing the data rate if the signal-to-noise ratio for the return link is less than a first threshold; and
  increasing the data rate if the signal-to-noise ratio for the return link is greater than a second threshold.

40. The machine-readable storage medium of claim 37, wherein the machine-executable instructions are further adapted for causing the machine to perform a method comprising:
  transmitting a bit of the message for a first duration of time to reduce the data rate; and
  transmitting a bit of the message for a second duration of time to increase the data rate, the first duration of time being greater than the second duration of time.

41. The machine-readable storage medium of claim 37, wherein the machine-executable instructions are further adapted for causing the machine to perform a method comprising:
  adjusting the data rate to one of a set of discrete data rate-to-carrier bandwidth ratios.

42. The machine-readable storage medium of claim 37, wherein the return link comprises a current messaging time slot among a plurality of time slots in a series of time frames, and wherein the machine-executable instructions are further adapted for causing the machine to perform a method comprising:
  suspending the message if the current messaging time slot in a current time frame in the series of time frames expires before the message is complete; and
  resuming the message in a messaging time slot subsequent to the current messaging time slot in a time frame subsequent to the current time frame.

43. The machine-readable storage medium of claim 42, wherein the machine-executable instructions are further adapted for causing the machine to perform a method comprising:
  resuming the message at a beginning of the messaging time slot subsequent to the current messaging time slot in the time frame subsequent to the current time frame.

44. The machine-readable storage medium of claim 37, wherein the machine-executable instructions are further adapted for causing the machine to perform a method comprising:
  determining that a duration of the message is greater than a selected number of durations of a messaging time slot in the return link among a plurality of time slots in a series of time frames forming the return link; and
  transmitting the message for a transmission duration greater than a duration of the messaging time slot, wherein the message is transmitted until its transmission is complete.

* * * * *